United States Patent
Lo et al.

(10) Patent No.: US 9,424,475 B1
(45) Date of Patent: Aug. 23, 2016

(54) CONSTRUCTION OBJECT DETECTION

(71) Applicant: Google Inc., Mountain View, CA (US)

(72) Inventors: Wan-Yen Lo, Sunnyvale, CA (US); David Ian Franklin Ferguson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 64 days.

(21) Appl. No.: 14/488,792

(22) Filed: Sep. 17, 2014

(51) Int. Cl.
*G06K 9/00* (2006.01)
*G06K 9/46* (2006.01)

(52) U.S. Cl.
CPC ......... *G06K 9/00791* (2013.01); *G06K 9/4604* (2013.01); *G06K 9/00536* (2013.01); *G06K 9/00798* (2013.01); *G06K 9/00818* (2013.01); *G06K 9/00825* (2013.01); *G06K 9/4652* (2013.01)

(58) Field of Classification Search
CPC ........... G06K 9/00825; G06K 9/4652; G06K 9/00536; G06K 9/00818; G06K 9/00791; G06K 9/00798
See application file for complete search history.

(56) References Cited

U.S. PATENT DOCUMENTS

| | | | |
|---|---|---|---|
| 8,996,228 B1* | 3/2015 | Ferguson | G01C 21/3461 348/118 |
| 9,056,395 B1* | 6/2015 | Ferguson | G08G 1/09623 |
| 9,195,914 B2* | 11/2015 | Fairfield | G06K 9/78 |
| 9,221,461 B2* | 12/2015 | Ferguson | B60W 30/00 |
| 9,233,688 B2* | 1/2016 | Clarke | B60W 30/00 |
| 2009/0074249 A1 | 3/2009 | Moed et al. | |
| 2010/0054538 A1* | 3/2010 | Boon | G06K 9/00798 382/104 |
| 2010/0104137 A1* | 4/2010 | Zhang | G06K 9/00805 382/104 |
| 2012/0288145 A1* | 11/2012 | Kido | G06K 9/00791 382/103 |
| 2012/0288191 A1* | 11/2012 | Kido | G06K 9/4652 382/165 |
| 2014/0063232 A1 | 3/2014 | Fairfield et al. | |
| 2014/0067187 A1 | 3/2014 | Ferguson et al. | |
| 2015/0165973 A1* | 6/2015 | Takemae | G08G 1/167 348/148 |
| 2015/0210312 A1* | 7/2015 | Stein | B60W 30/00 701/41 |
| 2015/0278615 A1* | 10/2015 | Ogawa | G06K 9/00818 348/148 |

FOREIGN PATENT DOCUMENTS

EP      1557692 B1      6/2009

OTHER PUBLICATIONS

Kim, Sang-Kyun. "Efficient road sign detection and recognition algorithm." Aerospace/Defense Sensing and Controls. International Society for Optics and Photonics, 1998.*

(Continued)

*Primary Examiner* — Stephen R Koziol
*Assistant Examiner* — Jonathan S Lee
(74) *Attorney, Agent, or Firm* — Lerner, David, Littenberg, Krumholz & Mentlik, LLP

(57) ABSTRACT

Aspects of the disclosure relate to identifying construction objects. As an example, an image captured by a camera associated with a vehicle as the vehicle is driven along a roadway may be received. This image may be converted into a first channel corresponding to an average brightness contribution from red, blue and green channels of the image. The image may also be converted into a second channel corresponding to a contribution of a color from the red and the green channels of the image. A template may then be used to identify a region of the image corresponding to a potential construction object from the first channel and the second channel.

20 Claims, 12 Drawing Sheets

(56) References Cited

OTHER PUBLICATIONS

Drew, Mark S., Graham D. Finlayson, and Abhilash Jindal. "Colour image compression by grey to colour conversion." IS&T/SPIE Electronic Imaging. International Society for Optics and Photonics, 2011.*

McKeon et al., "Obstacle Recognition Using Region-Based Color Segmentation Techniques for Mobile Robot Navigation", Proc. of SPIE, vol. 6384, 63840R, 2006, 9 pages.

Gavrila et al., 'Real-Time Object Detection for "Smart" Vehicles', 7 pages, 1999.

* cited by examiner

CONSTRUCTION OBJECT DETECTION

BACKGROUND

Autonomous vehicles, such as vehicles which do not require a human driver, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. Autonomous vehicles may also use the cameras, sensors, and global positioning devices to gather and interpret images and sensor data about its surrounding environment, e.g., parked cars, trees, buildings, etc.

Information from the perception system may be combined with highly detailed map information in order to allow a vehicle's computer to safely maneuver the vehicle in various environments. This highly detailed map information may describe expected conditions of the vehicle's environment such as the shape and location of roads, traffic signals, and other objects. In this regard, the information from the perception system and detailed map information may be used to assist a vehicle's computer in making driving decisions involving intersections and traffic signals.

BRIEF SUMMARY

One aspect of the disclosure provides a method of identifying potential construction objects from images. The method includes receiving, by one or more computing devices, an image captured by a camera associated with a vehicle as the vehicle is driven along a roadway. The method also includes converting, by the one or more computing devices, the image into a first channel corresponding to an average brightness contribution from red, blue and green channels of the image. The method also includes converting, by the one or more computing devices, the image into a second channel corresponding to a contribution of a color from the red and the green channels of the image. The method includes using, by the one or more computing devices, a template to identify a region of the image corresponding to a potential construction object from the first channel and the second channel.

In one example, the method also includes using a classifier to determine whether the region includes a stripe and identifying the potential construction object as a construction object based on the determination of whether the region includes a stripe. In another example, the template includes a first inner area that is situated within a second middle area that is situated within a third outer area, and using the template also includes processing image data within both the first inner area and third outer area to identify the region. In this example, when using the template, data within the second middle area exclusive of the first inner region is ignored. In addition, identifying the region also includes determining from the first channel whether image data within the first inner area of the template corresponding to the region meets a brightness threshold value. Further, identifying the region also includes determining from the second channel whether a difference in image data values between the first inner area and the third outer area meets a threshold color value. In another example, the contribution of color corresponds to at least one of yellow, orange, and red.

Another aspect of the disclosure provides a system for identifying potential construction objects from images. The system includes one or more computing devices configured to receive an image captured by a camera associated with a vehicle as the vehicle is driven along a roadway, convert the image into a first channel corresponding to an average brightness contribution from red, blue and green channels of the image, convert the image into a second channel corresponding to a contribution of a color from the red and the green channels of the image, and use a template to identify a region of the image corresponding to a potential construction object from the first channel and the second channel.

In one example, the one or more computing devices are also configured to using a classifier to determine whether the region includes a stripe and identify the potential construction object as a construction object based on the determination of whether the region includes a stripe. In another example, the template includes a first inner area that is situated within a second middle area that is situated within a third outer area, and the one or more computing devices are also configured to use the template by processing image data within both the first inner area and third outer area to identify the region. In this example, the one or more computing devices are also configured to use the template by ignoring image data within the second middle area exclusive of the first inner region. In addition, the one or more computing devices are also configured to identify the region by determining from the first channel whether image data within the first inner area of the template corresponding to the region meets a brightness threshold value. Further, the one or more computing devices are also configured to identify the region by determining from the second channel whether a difference in image data values between image data from the first inner area and the third outer area meets a threshold color value. In another example, the system also includes the vehicle.

A further aspect of the disclosure provides a non-transitory, tangible machine readable medium on which instructions are stored. The instructions, when executed by one or more processors, cause the one or more processors to perform a method of identifying potential construction objects from images. The method includes receiving an image captured by a camera associated with a vehicle as the vehicle is driven along a roadway, converting the image into a first channel corresponding to an average brightness contribution from red, blue and green channels of the image, converting the image into a second channel corresponding to a contribution of a color from the red and the green channels of the image, and using a template to identify a region of the image corresponding to a potential construction object from the first channel and the second channel.

In one example, the method also includes using a classifier to determine whether the region includes a stripe and identifying the potential construction object as a construction object based on the determination of whether the region includes a stripe. In another example, the template includes a first inner area that is situated within a second middle area that is situated within a third outer area, and using the template also includes processing image data within both the first inner area and third outer area to identify the region. In this example, when using the template, data within the second middle area exclusive of the first inner region is ignored. In addition, identifying the region also includes determining from the first channel whether image data within the first inner area of the template corresponding to the region meets a brightness threshold value. Further, identifying the region also includes determining from the second channel whether a difference in image data values between the first inner area and the third outer area meets a threshold color value. In another example, the contribution of color corresponds to at least one of yellow, orange, and red.

DETAILED DESCRIPTION

Overview

Figure 1:
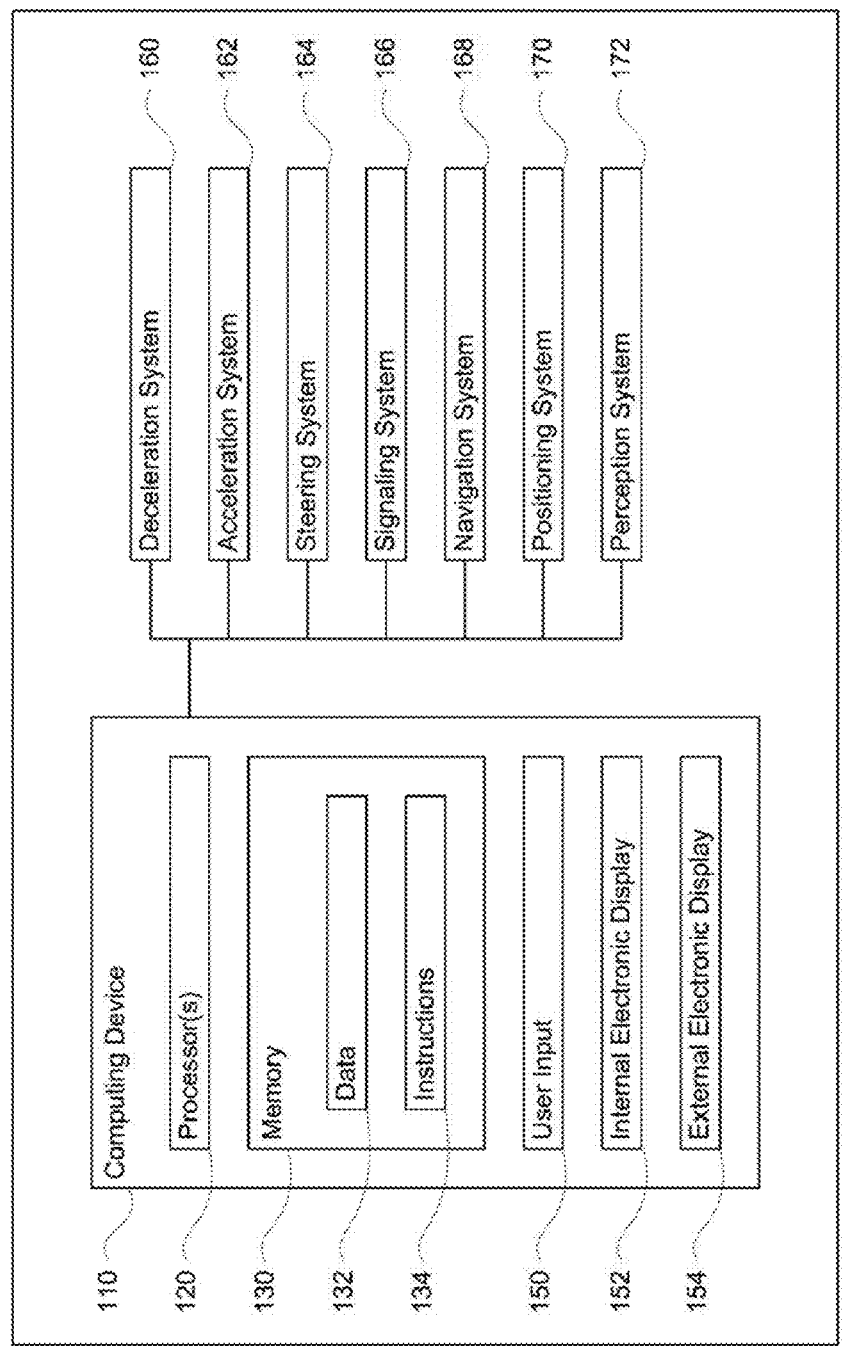
FIG. 1 is a functional diagram of a system in accordance with aspects of the disclosure.

The technology relates to detecting construction objects in real time. By doing so, one or more computers may use the information to plan how to maneuver a vehicle in an autonomous driving mode. For example, the vehicle's computers may receive information from sensors in real time to detect and respond to objects in the vehicle's environment. However, while the information from the sensors about the objects may provide their approximate size, location, and speed, this information may not also include a type of the object. The type of the object can be an important key to safely maneuvering an object. In this regard, detecting objects such as cones, poles, barriers, etc. as well as objects which the vehicle has not previously observed as construction objects as early and as efficiently as possible is important.

As noted above, the vehicle's computers may receive information from various sensors. These sensors may include cameras mounted at various locations on the vehicle. In this regard, as the vehicle is driven along a roadway, the vehicle's cameras may capture images of the vehicle's environment, including the construction objects described above.

These images may be processed by the vehicle's one or more computers. For example, the one or more computers may first convert each image received from the vehicle's cameras into two channels. The first channel may correspond to the brightness of each pixel of the image. The second channel may correspond to the amount of orange (or yellow orange and red) in the image.

Templates may be used to detect bright orange regions given the brightness and orangeness values. A template may include three portions, an inner area, a middle area, and an outer area. Because of the expected differences in distances between the vehicle and construction objects, the template may be applied in various sizes. The templates may be used in a sliding window pattern over the output image or images in order to detect bright orange regions in the two output images that meet first and second thresholds for brightness and orangeness values.

Areas detected to meet both the first and second threshold values for any sized template may be identified as potential construction objects. Further analysis may be performed in order to confirm or increase the confidence in the determination that an object is a construction object. For example, a cascade classifier, such as one implementing a Viola-Jones object detection framework using, may be used to detect whether the potential construction object includes orange stripes. While further classifiers may also be used, detecting a bright orange stripe may be most useful s it covers a wide-variety of construction objects.

The aspects described herein allow for the detection of construction objects which do not limit those objects to a particular type or shape. This can be especially important as there are a large variety of different types of construction objects with different configurations, and even within a specific type, such as a construction barrier, there can be a wide variety of shapes, sizes, and configurations. Thus, the vehicle's computers do not need to store and run different detectors and classifiers for different types of construction objects. In addition, because the features described above are not specific to a shape, but rather look for common color and brightness characteristics, they are robust with the possibility of vast variation in physical features and allow for the detection and recognition of new and different types of construction objects that the vehicle's computers had not previously observed.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152. In this regard, internal electronic display 152 may be located within a cabin of vehicle 100 and may be used by computing device 110 to provide information to passengers within the vehicle 100.

In one example, computing device 110 may be an autonomous driving computing system incorporated into vehicle 100. The autonomous driving computing system may capable of communicating with various components of the vehicle as needed in order to control the vehicle in fully autonomous (without input from a driver) as well as semi-autonomous (some input from a driver) driving modes.

Figure 2:
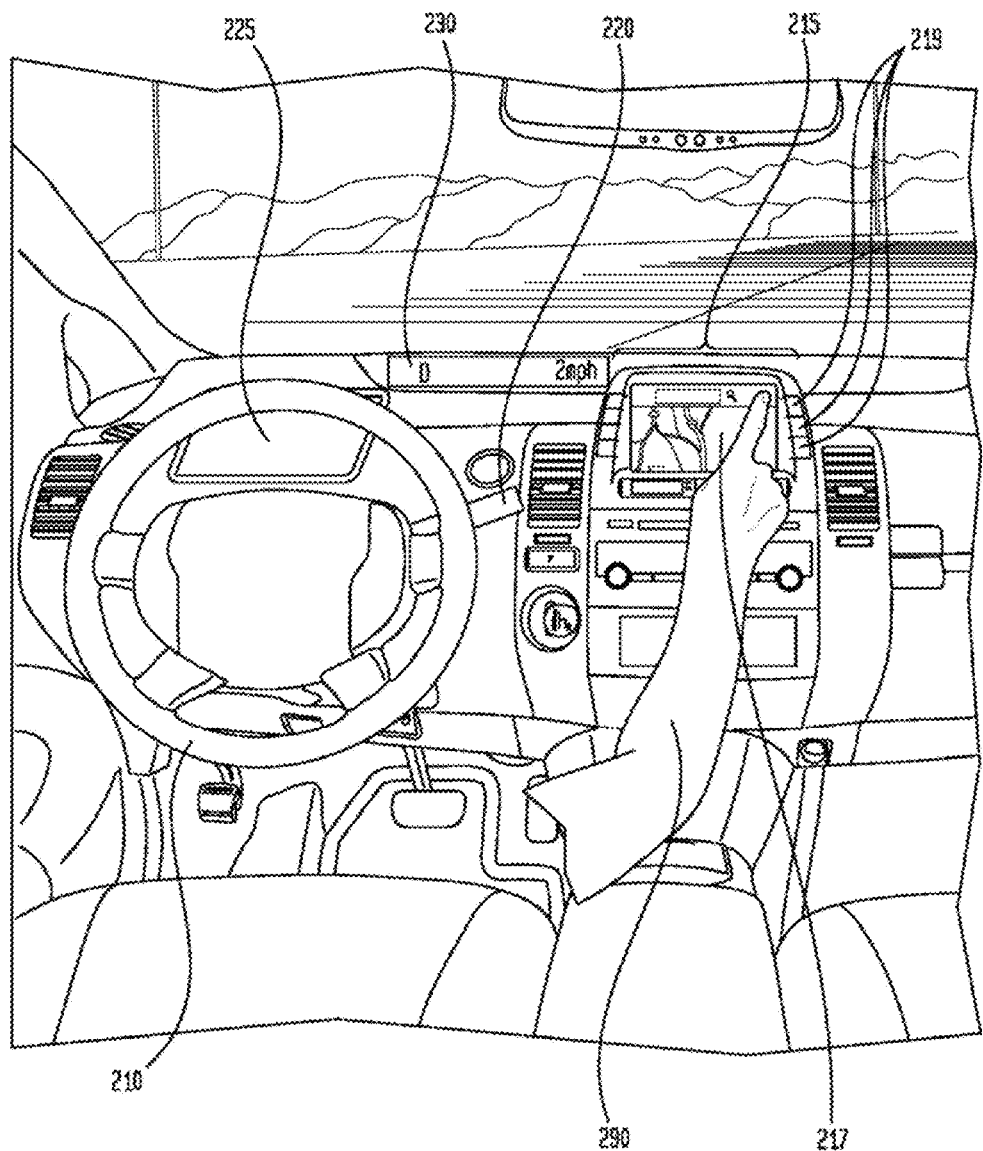
FIG. 2 is an interior of an autonomous vehicle in accordance with aspects of the disclosure.

As an example, FIG. 2 depicts an interior design of a vehicle having autonomous, semiautonomous, and manual (continuous input from a driver) driving modes. In this regard, the autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (again, which may be a part of electronic display 152), or button inputs 219, for activating or deactivating one or more autonomous driving modes and for enabling a driver or passenger 290 to provide information, such as a navigation destination, to the computing device 110.

Returning to FIG. 1, when engaged, computer 110 may control some or all of these functions of vehicle 100 and thus be fully or partially autonomous. It will be understood that although various systems and computing device 110 are shown within vehicle 100, these elements may be external to vehicle 100 or physically separated by large distances.

In this regard, computing device 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps identifying the shape and elevation of roadways, lane lines, intersections, crosswalks, speed limits, traffic signals, buildings, signs, real time traffic information, vegetation, or other such objects and information.

Figure 3:
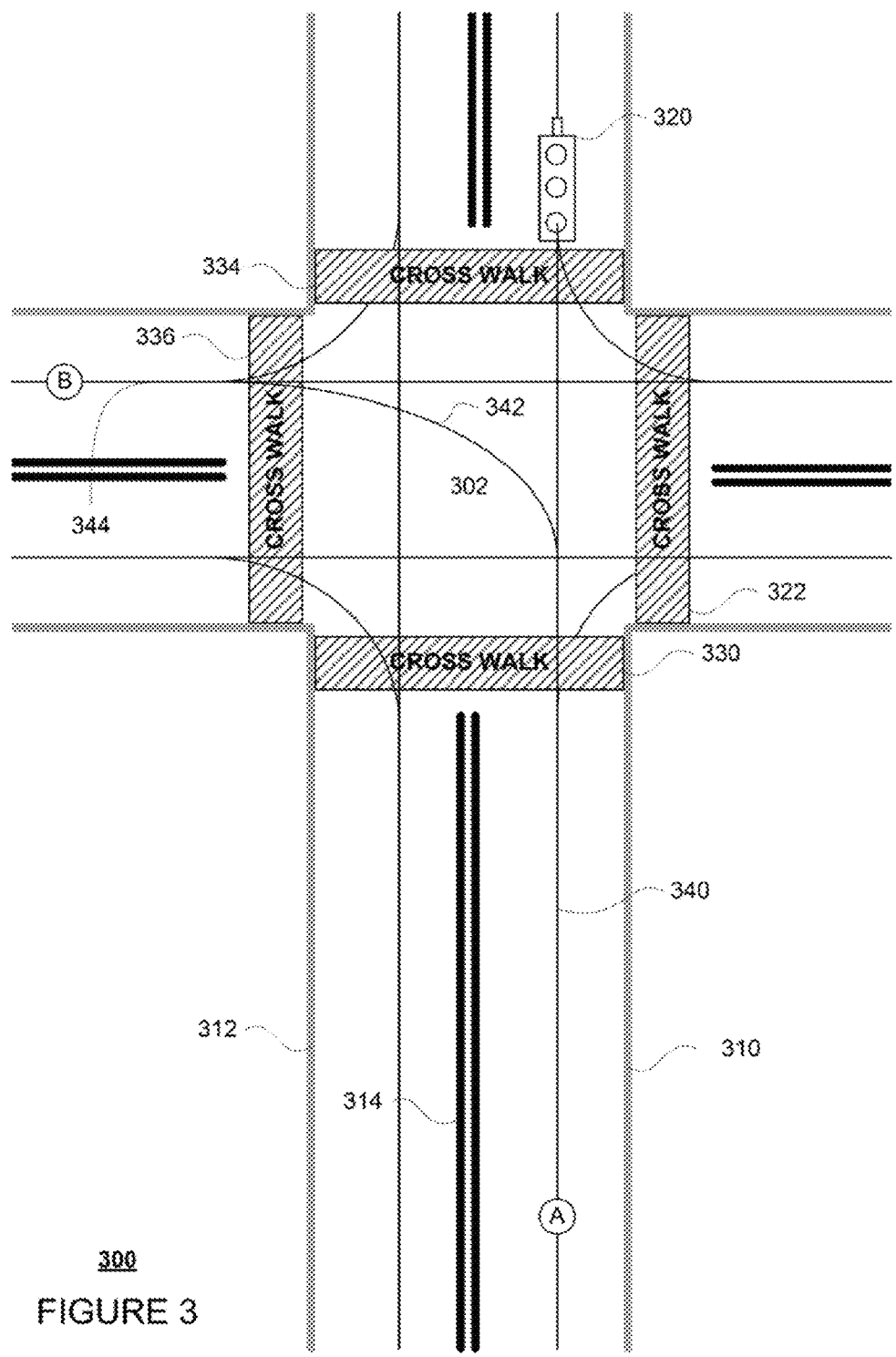
FIG. 3 is an example of detailed map information in accordance with aspects of the disclosure.

FIG. 3 is an example of detailed map information 300 for a section of roadway including an intersection 302. In this example, the detailed map information 300 includes information identifying the shape, location, and other characteristics of lane lines 310, 312, 314, traffic signal 320, crosswalks 330, 332, 334, 336. Although the examples herein relate to a simplified three-light, three-state traffic signals (e.g, a green light state indicating that a vehicle can proceed through an intersection, a yellow light state indicating a transition state where the vehicle can proceed with caution but may need to stop at an intersection, and a red light state indicating that the vehicle should stop before the intersection, etc.), other types of traffic signals, such as those for right or left turn only lanes may also be used.

In addition, the detailed map information includes a network of rails 340, 342, 344, which provide the vehicle's computer with guidelines for maneuvering the vehicle so that the vehicle follows the rails and obeys traffic laws. As an example, a vehicle's computer may maneuver the vehicle from point A to point B (two fictitious locations not actually part of the detailed map information) by following rail 340, transitioning to rail 342, and subsequently transitioning to rail 344 in order to make a left turn at intersection 302.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting and performing analysis on objects external to the vehicle such as other vehicles, obstacles in the roadway, traffic signals, signs, trees, etc. For example, the perception system 172 may include lasers, sonar, radar, one or more cameras, or any other detection devices which record data which may be processed by computing device 110. In the case where the vehicle is a small passenger vehicle such as a car, the car may include a laser mounted on the roof or other convenient location as well as other sensors such as cameras, radars, sonars, and additional lasers. The computing device 110 may control the direction and speed of the vehicle by controlling various components. By way of example, if the vehicle is operating completely autonomously, computing device 110 may navigate the vehicle to a location using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Figure 4:
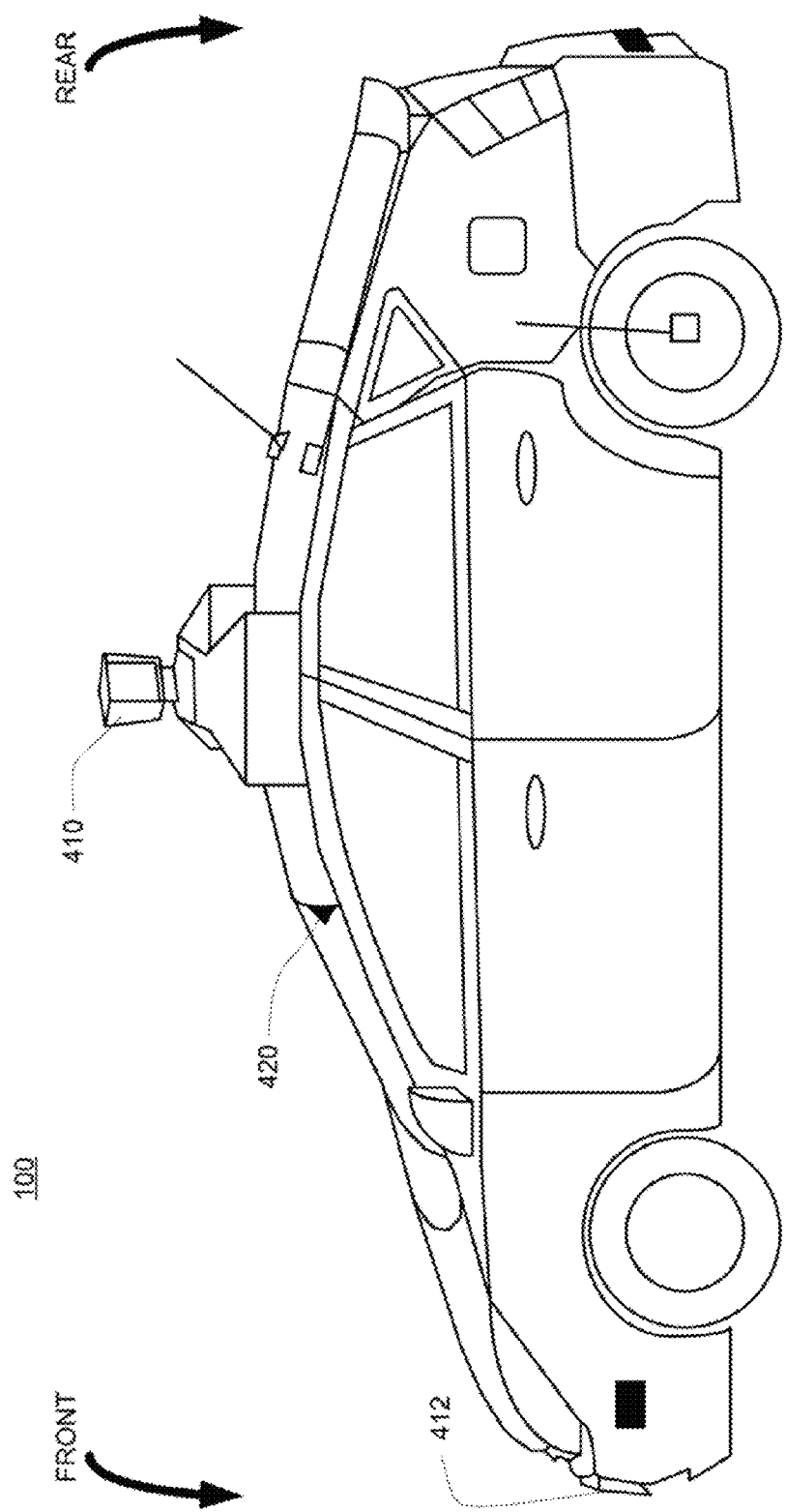
FIG. 4 is an exterior of an autonomous vehicle in accordance with aspects of the disclosure.

FIG. 4 is an example external view of vehicle 100 described above. As shown, various components of the perception system 172 may be positioned on or in the vehicle 100 in order to better detect external objects while the vehicle is being driven. In this regard, one or more sensors, such as laser range finders 410 and 412 may be positioned or mounted on the vehicle. As an example, the one or more computing devices 110 (not shown) may control laser range finder 410, e.g., by rotating it 180 degrees. In addition, the perception system may include one or more cameras 420 mounted internally on the windshield of vehicle 100 to receive and analyze various images about the environment. In addition to the laser range finder 410 is positioned on top of perception system 172 in FIG. 4, and the one or more cameras 420 mounted internally on the windshield, other detection devices, such as sonar, radar, GPS, etc., may also be positioned in a similar manner.

The one or more computing devices 110 may also include features such as transmitters and receivers that allow the one or more devices to send and receive information to and from other devices. For example, the one or more computing devices may determine information about the current status of a traffic signal light as well as information about when the status of the traffic signal light changes (from green to yellow to red to green). The one or more computing devices may send this information to other computing devise associated with other vehicles. Similarly, the one or more computing devices may receive such information from other computing devices. For example, the one or more computing devise may receive information about the current status of a traffic signal light as well as information about when the status of the traffic signal light changes from one or more other computing devices associated with other autonomous or non-autonomous vehicles. As another example, the one or more computing devices may receive such information with devices associated with the traffic signal lights. In this regard, some traffic signal lights may include transmitters that send out information about the current status of a traffic signal light as well as information about when the status of the traffic signal light changes.

This information may be sent and received via any wireless transmission method, such as radio, cellular, Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
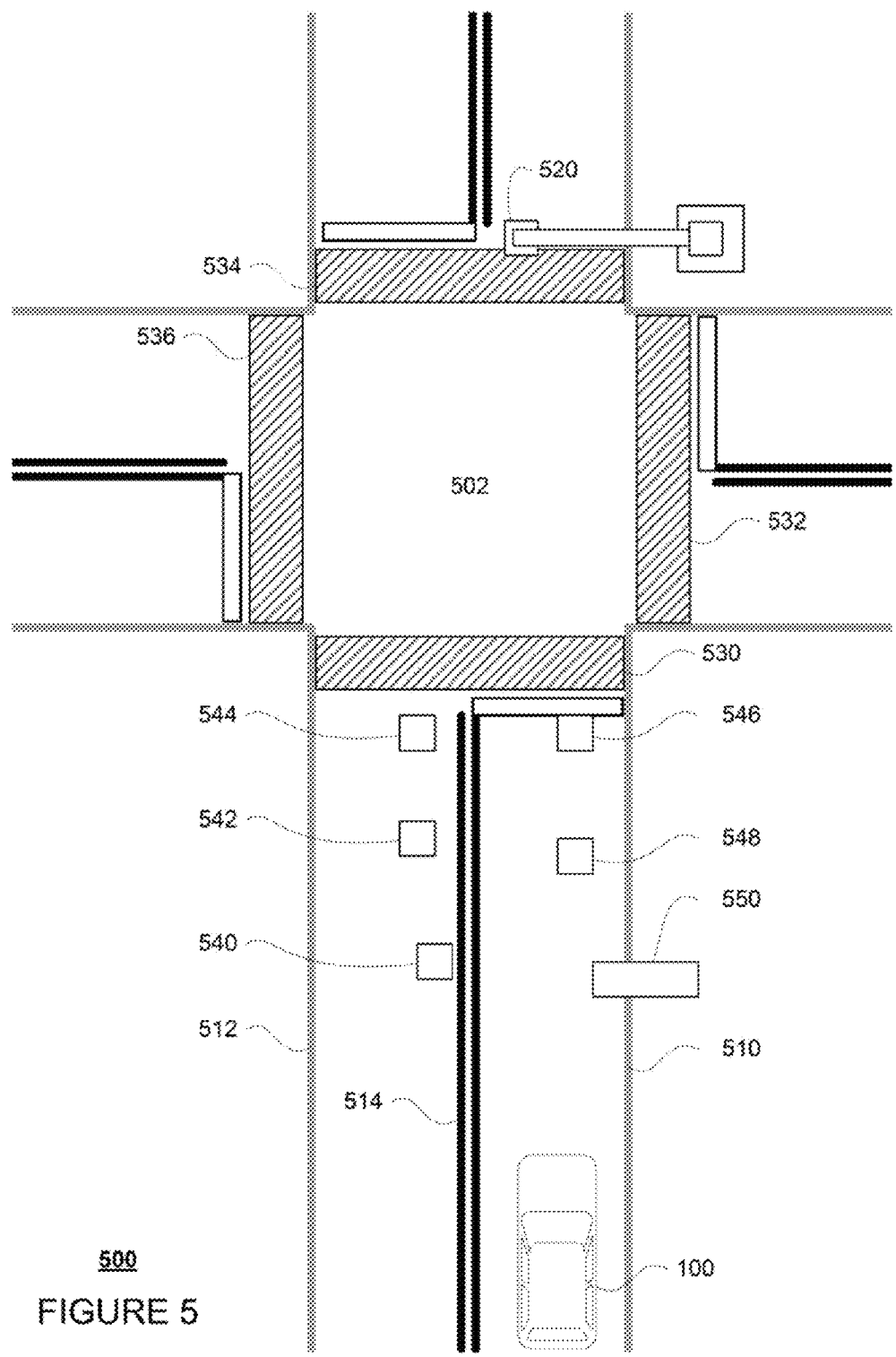
FIG. 5 is an example diagram of a section of roadway including an intersection in accordance with aspects of the disclosure.

As noted above, a vehicle's one or more computing devices may maneuver the vehicle using the various systems described above. For example, FIG. 5 depicts a section of roadway 500 including an intersection 502. In this example, vehicle 100 is approaching intersection 502 and may be controlled, for example by one or more computing device 110 in an autonomous driving mode as described above.

Intersection 502 corresponds to the intersection 302 of the detailed map information 300. In this regard, lane lines 510, 512, and 514 correspond to the shape, location, and other characteristics of lane lines 310, 312, and 314, respectively. Similarly crosswalks 530, 532, 534, and 536 correspond to the shape, location, and other characteristics of crosswalks 330, 332, 334, and 336, respectively and traffic signal 520 corresponds to the shape, location, and other characteristics of traffic signal 320. In this regard, vehicle's position relative to intersection 502 may correspond to that of point A relative to the detailed map information 300.

Again, as vehicle 100 approaches intersection 502, the vehicle is also approaching a plurality of objects 540, 542, 544, 546, 548, and 550 that are at least partially in the roadway 500. These objects are temporary (e.g. easily moved) construction objects and do not correspond to the features of the detailed map information 300.

Figure 6:
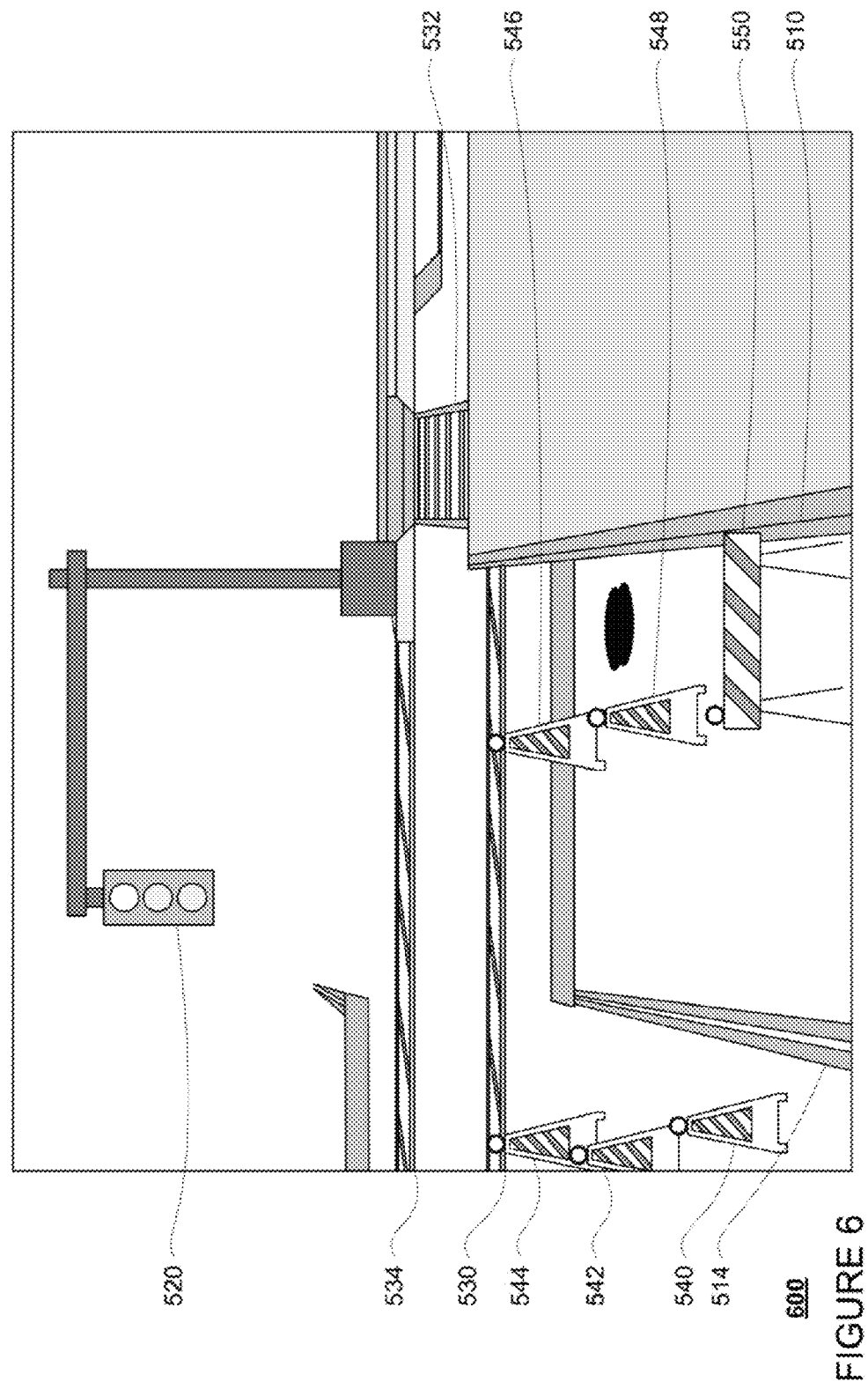
FIG. 6 is an example image of a vehicle's environment in accordance with aspects of the disclosure.

As vehicle 100 is driven towards the intersection 502, the vehicle's perception system 172 receives and processes information from the various sensors discussed above. For example, the camera 420 may capture images of the vehicle's environment. FIG. 6 is an example of an image that may have been captured by camera 420 from the location of vehicle 100 in FIG. 6.

In this example, image 600 includes various objects such as lane lines 510 and 514, crosswalks 530, 532, and 534, traffic signal 520, and objects 540, 542, 544, 546, 540, and 550. Again each of objects 540, 542, 544, 546, 548, and 550 are temporary construction objects including folding cones (540, 542, 544, 546, 548) and a barrier 550. As can be seen from image 600, these construction objects all include a striped pattern. Typically, such striped patterns are provided in some shade of orange against a white background. Thus, the shaded portions of these construction objects may correspond to the color orange.

Figure 7:
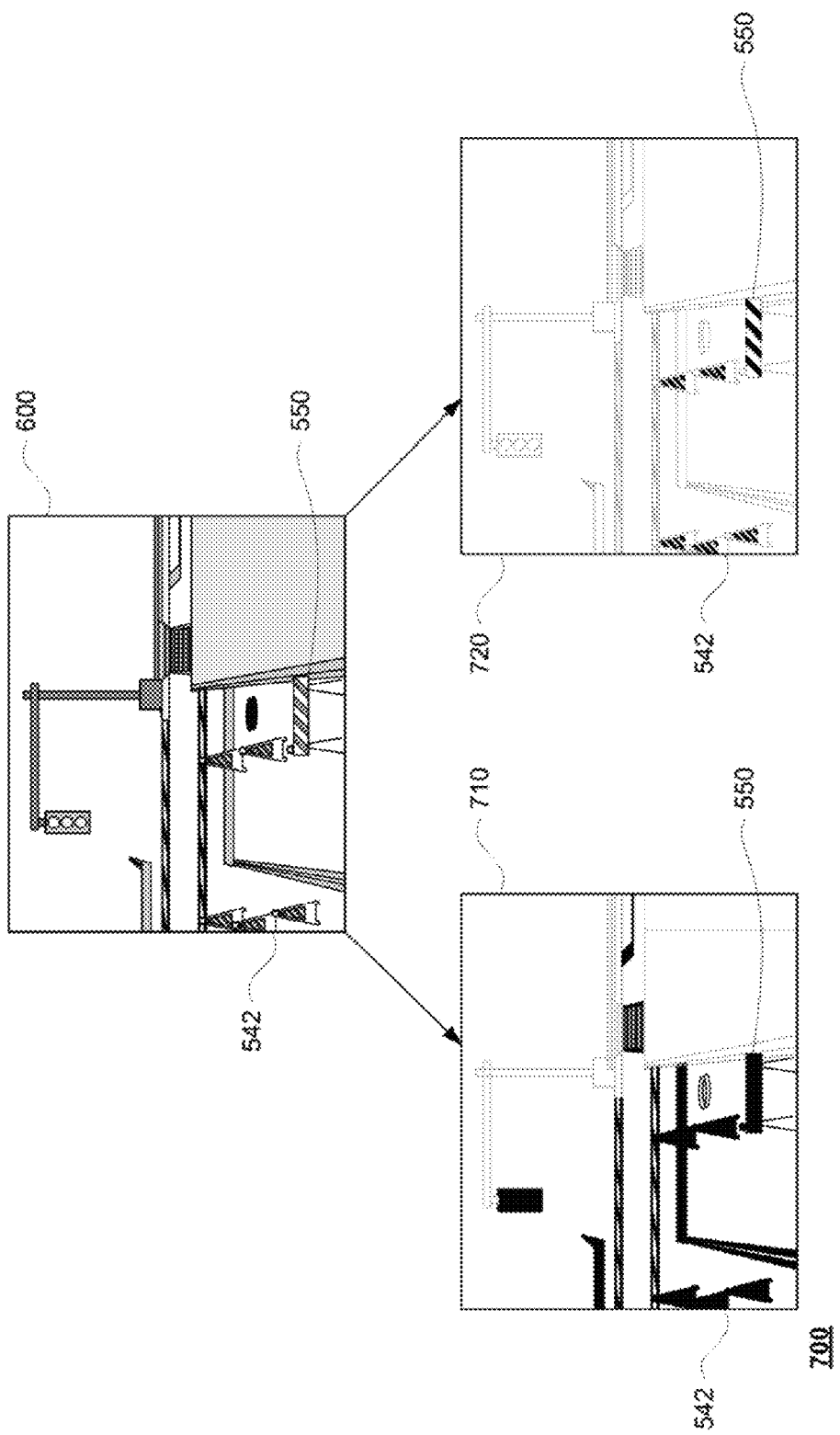
FIG. 7 is another example of images of a vehicle's environment in accordance with aspects of the disclosure.

The images captured by the vehicle's cameras may be processed by the vehicle's one or more computers in order to convert the images into two image channels. For example, various values may be determined for each pixel in an image and used to produce an output image for such values. FIGURE 7 is an example 700 of two output images 710 and 720 corresponding to different image channels that may be produced from the pixels of image 600.

The first channel of the two image channels may provide a brightness value for each pixel of an image. As an example, the first channel may correspond to the average of the brightness contribution from the red, blue and green channels of the pixels of the image. In this regard, a brightness value for a given pixel may be determined as Brightness=(R+G+B)/3.0, where R, G, and B correspond to the red, blue and green channels of the given pixel, respectively. In addition, various normalization techniques may also be used to provide a value corresponding to the average of the brightness contribution from the red, blue and green channels of the pixels of the image or a brightness value for each pixel of an image, such as contrast within the local region of the image.

Output image 710 may correspond to an image channel for the brightness values of the pixels of image 600. In this example, the pixels of output image 710 corresponding to the highest brightness values of the pixels of image 600 are shown in black. Thus, highly reflective or brightly colored surfaces of images 600 (such as those corresponding to lane lines 510 and 514, crosswalks 530, 532, and 534, traffic signal 520, and objects 540, 542, 544, 546, 540, and 550) may be associated with greater brightness values and are thus shown as black in output image 710.

The second channel may correspond to the amount of a particular color, such as orange or yellow orange and red, for each pixel of the image. As an example, the second channel may correspond to the contribution of orange from the red and green channels of the pixels of the image. In this regard, an orangeness value for a given pixel may be determined as Orangeness=((R−G)/(R+G+10))*255.0, again R and G correspond to the red and green channels of a given pixel, respectively. Other normalization techniques may also be used to provide a value corresponding to the contribution of orange from the red and green channels of the pixels of the image or an amount of a particular color for each pixel of the image such as a linear or non-linear combination of R, G, B values of a single pixel, or over a local neighborhood. Other examples may include using an un-normalized color transform such as (R−G), though this may be less robust to lighting change or shadows; normalization by brightness such as (R−G)/((R+G+B)/3); normalization by a particular such as (R−G)/R; or normalization by a maximum red component (max R) for pixels within a local neighborhood such as (R−G)/(max R).

Output image 720 may correspond to an image channel for the orangeness values of the pixels of image 600. In this example, the pixels of output image 710 corresponding to the highest orangeness values of the pixels of image 600 are shown in black. Thus, the orange stripes of objects 540, 542, 544, 546, 540, and 550 may be associated with greater brightness values and are thus shown as black in output image 720. Although the output images of example 700 are shown as two different images for ease of understanding and clarity, a single image where each pixel is represented by both a brightness value and an orangeness value may also be used.

Figure 8:
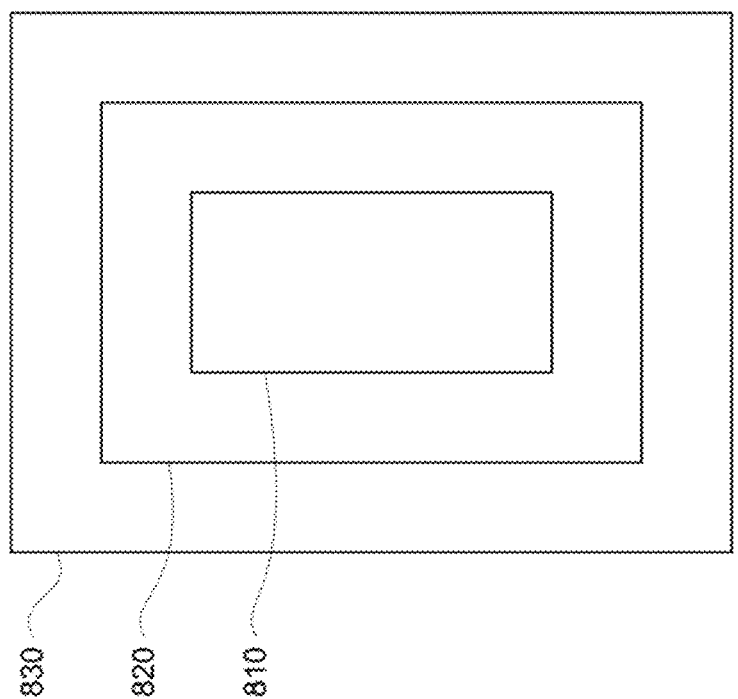
FIG. 8 is an example of a template for identifying construction objects in accordance with aspects of the disclosure.

Templates may be used to detect regions that are both bright and orange based on the brightness and orangeness values discussed above. FIG. 8 is an example of a template 800. In this example, template 800 includes 3 regions: a first inner region 810, a second middle region 820 surrounding (but not including) the first inner region, and a third outer region 830 surrounding (but not including) the first inner region and second middle region. Each of these three regions includes a generally rectangular shape which may be most useful when attempting to detect construction objects having a striped pattern (such as objects 540, 542, 544, 546, 540, and 550). Because of the expected differences in distances between the vehicle and potential construction objects, the same template may applied in various sizes corresponding, for example, to different ratios. In that regard, the ratio of the areas of the three regions of template 800 may remain fixed as the size of the template changes.

Figure 9:
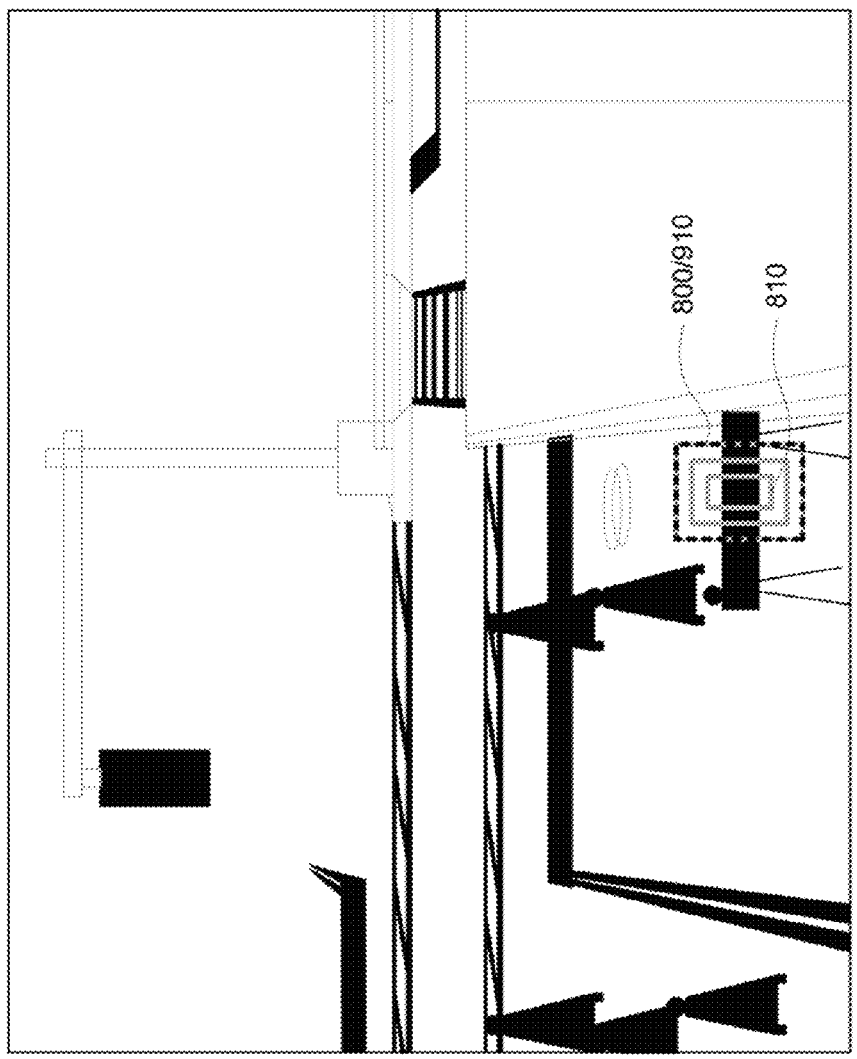
FIG. 9 is an example of using a template for identifying construction objects in an image of a vehicle's environment in accordance with aspects of the disclosure.

The templates may be used to detect regions with different characteristics from the output images. For example, the template 800 may be moved in a sliding window pattern over the output image 710 and used to identify regions in the output image (corresponding to regions in the image 600) that meet certain brightness criteria. For example, the template 800 may be used to detect regions of output image 710 where the brightness values within the inner region of template 800 meet a first threshold value corresponding to a brightness threshold. In this regard, FIG. 9 is an example 900 of a region 910 of the output image 710 where the brightness values of inner region 810 of template 800 meets the first threshold value.

Figure 10:
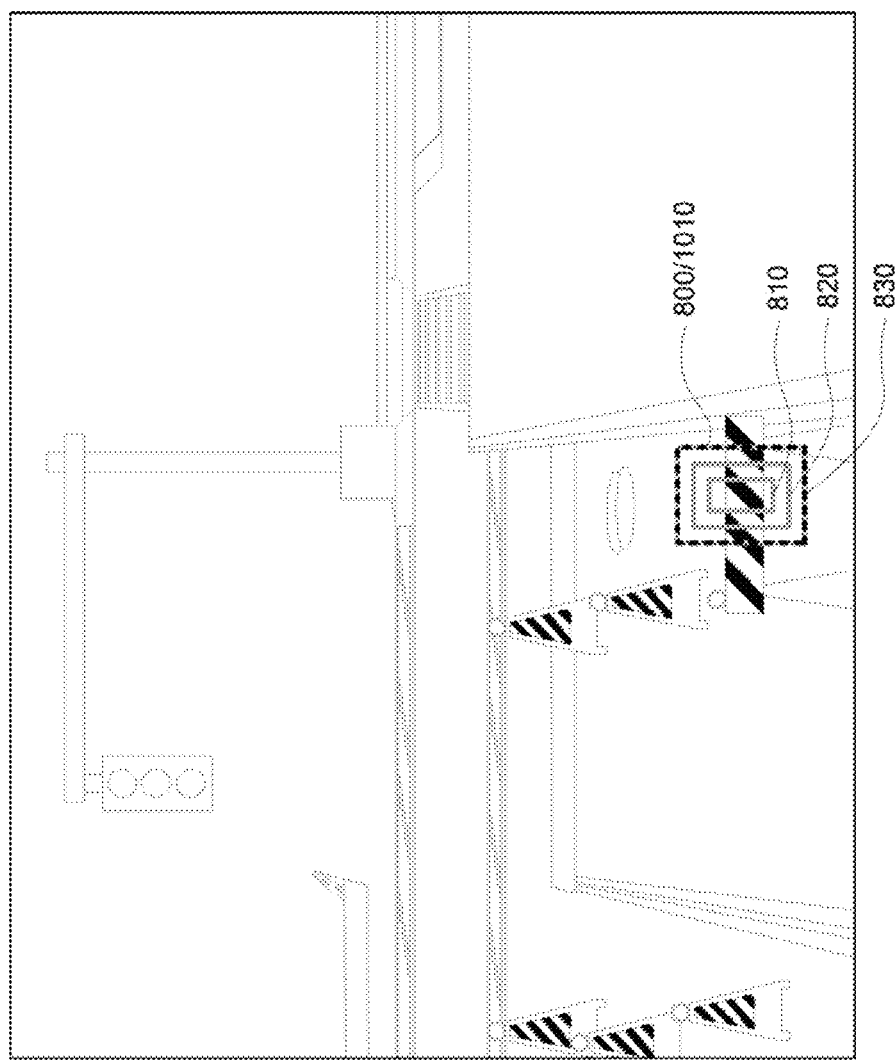
FIG. 10 is another example of using a template for identifying construction objects in an image of a vehicle's environment in accordance with aspects of the disclosure.

In addition, the template 800 may be moved in a sliding window pattern over the output image 720 and used to identify regions in the output image (corresponding to regions in the image 600) that meet certain orangeness criteria. For example, the template 800 may be used to detect regions of output image 710 where the difference in the orangeness values between the inner region 810 and the outer region 830 meets a second threshold value corresponding to an orangeness difference threshold. In this regard, the middle region 820 of the template, exclusive of the inner region 810, is ignored. In this regard, FIG. 10 is an example 1000 of a region 1010 of the output image 720 where the difference in orangeness values between the inner region 810 and outer region 830 of template 800 meets the second threshold value.

Figure 11:
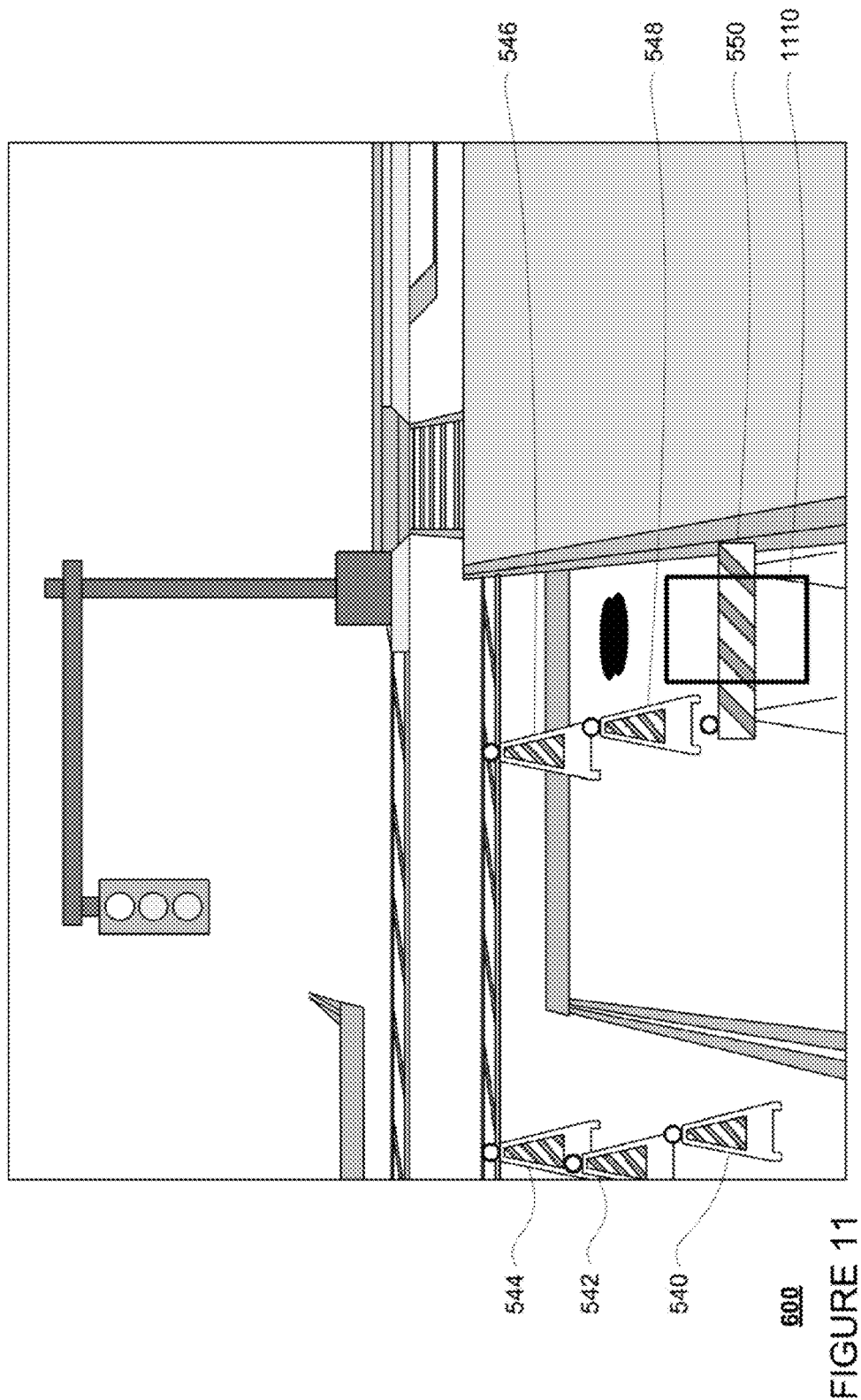
FIG. 11 is an example of an identified construction object in accordance with aspects of the disclosure.

Areas with an image that meet both the first and second threshold values for any sized template may be identified as potential construction objects. For example construction object 550 is within the regions 910 and 1010 of FIGS. 9 and 10. Thus, as shown in FIG. 11, at least a portion 1110 of construction object 550 in image 600 may be identified as or determined to be a potential construction object. Similar determinations may be made for each of the construction objects 540, 542, 544, 546, and 548.

Further analysis may also be performed in order to confirm or increase the confidence in the determination that an object is a construction object. For example, a cascade classifier, such as one implementing a Viola-Jones object detection framework using, may be used to detect whether the potential construction object includes orange stripes. In this regard, a BRIEF feature of this framework may also be used to compute the difference between two pixels in a region in all three color channels in order to detect the contrast of the stripes, and the color Haar feature of this framework may also be used to compute the average color different of two regions in order to detect the edges of stripes. While further classifiers may also be used, detecting a bright orange stripe may be especially useful as it covers a wide-variety of construction objects.

Once an object has been identified as a potential construction object, and in some examples further confirmed as a construction object, the vehicle's computing devices may control the vehicle accordingly. This may include slowing the vehicle down, in order to maneuver more cautiously around the construction objects, or even requesting a driver or passenger of the vehicle to take control until at least the vehicle has passed any detected potential (or confirmed) construction objects.

Figure 12:
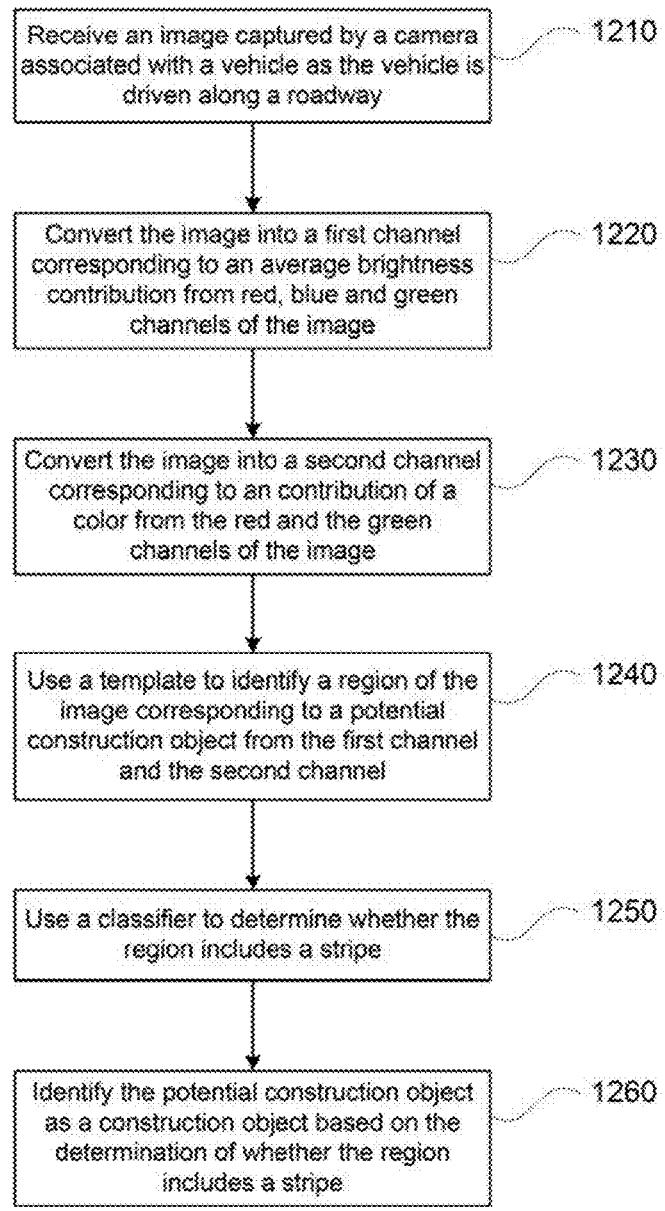
FIG. 12 is an example flow diagram in accordance with aspects of the disclosure.

FIG. 12 is an example flow diagram 1200 which depicts some of the aspects described above which may be performed by one or more computing devices such as one or more computing devices 110 of vehicle 100. In this example, an image captured by a camera associated with a vehicle as the vehicle is driven along a roadway is received at block 1210. This image is converted into a first channel corresponding to an average brightness contribution from red, blue and green channels of the image at block 1220. The image is also converted into a second channel corresponding to a contribution of a color from the red and the green channels of the image at block 1230. A template is then used to identify a region of the image corresponding to a potential construction object from the first channel and the second channel at block 1240. A classified is used to determine whether the region includes at stripe at 1250. The potential construction object is then identified as a construction object based on the determination of whether the region includes a stripe at block 1260.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of identifying potential construction objects from images, the method comprising:

receiving, by one or more computing devices, an image captured by a camera associated with a vehicle as the vehicle is driven along a roadway;

converting, by the one or more computing devices, the image into a first channel corresponding to an average brightness contribution from red, blue and green channels of the image;

converting, by the one or more computing devices, the image into a second channel corresponding to a contribution of a color from the red and the green channels of the image; and using, by the one or more computing devices, a template to identify a region of the image corresponding to a potential construction object from the first channel and the second channel, wherein the template includes a first inner area that is situated within a second middle area that is situated within a third outer area, and using the template further includes processing image data within both the first inner area and third outer area to identify the region such that data within the second middle area exclusive of the first inner area is ignored.

2. The method of claim 1, further comprising:
using a classifier to determine whether the region includes a stripe; and
identifying the potential construction object as a construction object based on the determination of whether the region includes a stripe.

3. The method of claim 1, wherein identifying the region further includes determining from the first channel whether image data within the first inner area of the template corresponding to the region meets a brightness threshold value.

4. The method of claim 3, wherein identifying the region further includes determining from the second channel whether a difference in image data values between the first inner area and the third outer area meets a threshold color value.

5. The method of claim 1, wherein the contribution of color corresponds to at least one of yellow, orange, and red.

6. A system for identifying potential construction objects from images, the system comprising one or more computing devices configured to:

receive an image captured by a camera associated with a vehicle as the vehicle is driven along a roadway;

convert the image into a first channel corresponding to an average brightness contribution from red, blue and green channels of the image;

convert the image into a second channel corresponding to a contribution of a color from the red and the green channels of the image; and use a template to identify a region of the image corresponding to a potential construction object from the first channel and the second channel wherein the template includes a first inner area that is situated within a second middle area that is situated within a third outer area, and using the template further includes processing image data within both the first inner area and third outer area to identify the region such that data within the second middle area exclusive of the first inner area is ignored.

7. The system of claim 6 wherein the one or more computing devices are further configured to:

using a classifier to determine whether the region includes a stripe; and
identify the potential construction object as a construction object based on the determination of whether the region includes a stripe.

8. The system of claim 6, wherein the one or more computing devices are further configured to identify the region by determining from the first channel whether image data within the first inner area of the template corresponding to the region meets a brightness threshold value.

9. The system of claim 8 wherein the one or more computing devices are further configured to identify the region by determining from the second channel whether a difference in image data values between image data from the first inner area and the third outer area meets a threshold color value.

10. The system of claim 6, further comprising the vehicle.

11. A non-transitory, tangible machine readable medium on which instructions are stored, the instructions, when executed by one or more processors, cause the one or more processors to perform a method of identifying potential construction objects from images, the method comprising:
   receiving an image captured by a camera associated with a vehicle as the vehicle is driven along a roadway;
   converting the image into a first channel corresponding to an average brightness contribution from red, blue and green channels of the image;
   converting the image into a second channel corresponding to a contribution of a color from the red and the green channels of the image; and
   using a template to identify a region of the image corresponding to a potential construction object from the first channel and the second channel wherein the template includes a first inner area that is situated within a second middle area that is situated within a third outer area, and using the template further includes processing image data within both the first inner area and third outer area to identify the region such that data within the second middle area exclusive of the first inner area is ignored.

12. The medium of claim 11, wherein identifying the region further includes determining from the first channel whether the first inner area of the template corresponding to the region meets a brightness threshold value.

13. The medium of claim 12, wherein identifying the region further includes determining from the second channel whether a difference in image data values between the first inner area and the third outer area meets a threshold color value.

14. The medium of claim 11, further wherein the method further comprises:
   using a classifier to determine whether the region includes a stripe; and
   identifying the potential construction object as a construction object based on the determination of whether the region includes a stripe.

15. The method of claim 1, wherein the first inner area, second middle area, and third outer area are rectangular.

16. The method of claim 1, further comprising using a second template including an inner area, a middle area, and an outer area are rectangular to identify the region, wherein the second template and first template are different sizes, and a ratio of sizes of the inner area of the second template, the middle area of the second template, and the outer area of the second template is a ratio of sizes of the first inner area, second middle area and third middle area.

17. The method of claim 1, wherein identifying the region further includes determining from the second channel whether a difference in image data values between the first inner area and the third outer area meets a threshold color value.

18. The method of claim 1, further comprising, after identifying the region, controlling the vehicle based on the potential construction object.

19. The system of claim 6, wherein identifying the region further includes determining from the second channel whether a difference in image data values between the first inner area and the third outer area meets a threshold color value.

20. The system of claim 6, wherein the one or more processors are further configured to, after identifying the region, control the vehicle based on the potential construction object.

* * * * *